United States Patent [19]

Smith

[11] 4,206,672
[45] Jun. 10, 1980

[54] CUTTING TOOL JIG WITH CUTTER GUARD

[76] Inventor: Willis A. Smith, 112 Sarles La., Pleasantville, N.Y. 10570

[21] Appl. No.: 934,165

[22] Filed: Aug. 16, 1978

[51] Int. Cl.$^2$ .................... B27B 25/08; B27B 27/06
[52] U.S. Cl. ........................................ 83/415; 83/409; 83/477.2; 83/478; 83/435.1; 83/437
[58] Field of Search ............... 83/409, 415, 477.2, 83/478, 435.1, 437, 425; 269/304

[56] References Cited

U.S. PATENT DOCUMENTS

| | | | |
|---|---|---|---|
| 2,881,812 | 4/1959 | Alumbaugh et al. | 83/435.1 |
| 2,894,543 | 7/1959 | Ivy, Jr. | 83/435.1 |
| 2,905,210 | 9/1959 | Thomas | 83/435.1 X |
| 2,929,419 | 3/1960 | Johnson | 83/435.1 |
| 2,966,177 | 12/1960 | Weiskoff | 83/435.1 |
| 3,986,420 | 10/1976 | Huntley et al. | 83/435.1 |
| 4,122,739 | 10/1978 | Marlow | 83/477.2 X |

*Primary Examiner*—J. M. Meister
*Attorney, Agent, or Firm*—Curtis Ailes

[57] ABSTRACT

In a jig for feeding a work piece into the cutter of a table rotary cutting tool and having a through-slot extending into the base plate of the jig from one edge thereof, a combination guard and work clamp comprising two parallel plates pivotally attached to the jig and operable to swing downwardly on opposite sides of the through-slot to clamp a work piece and to enclose the cutter as the work is advanced into the cutter.

20 Claims, 14 Drawing Figures

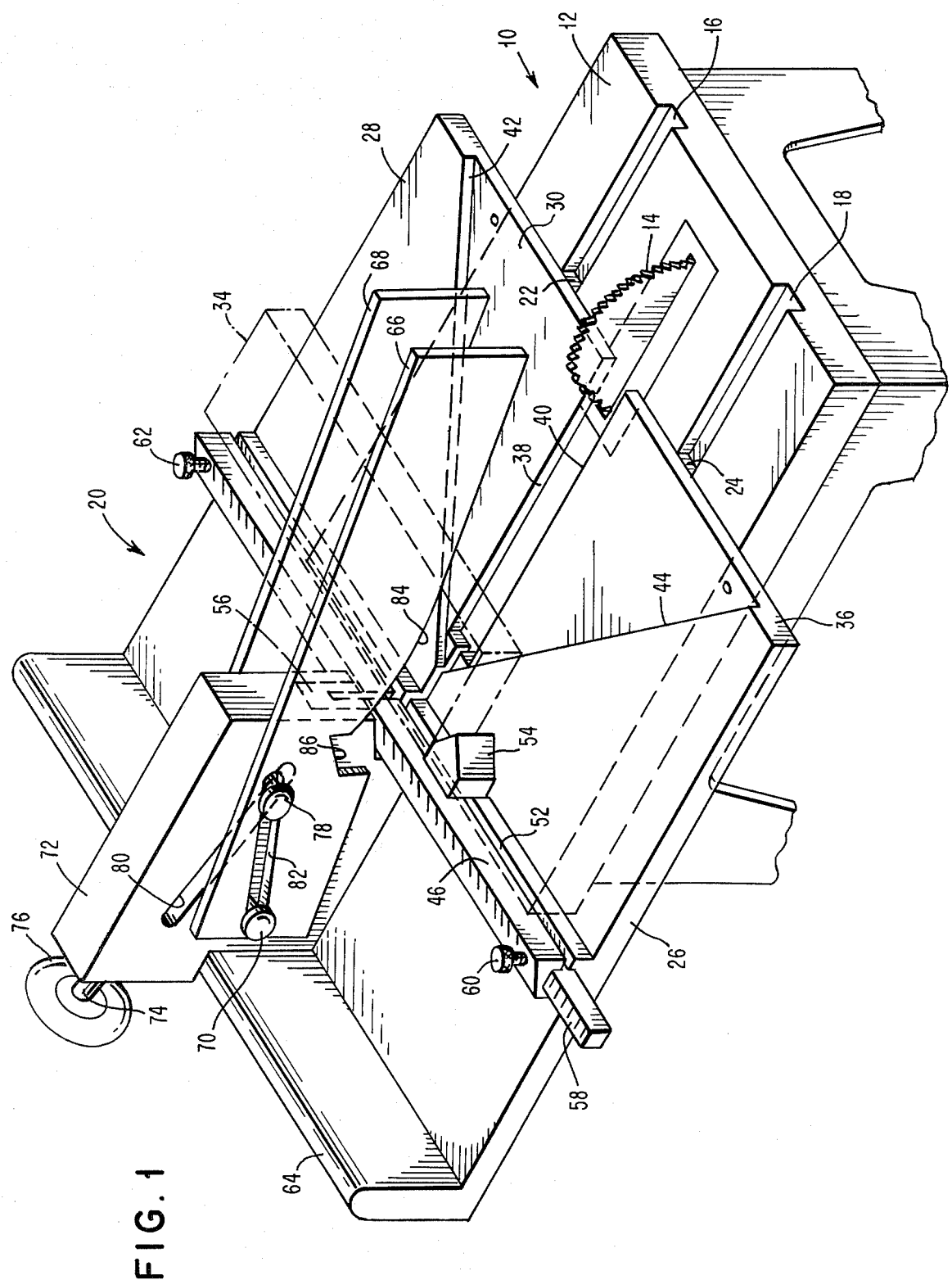

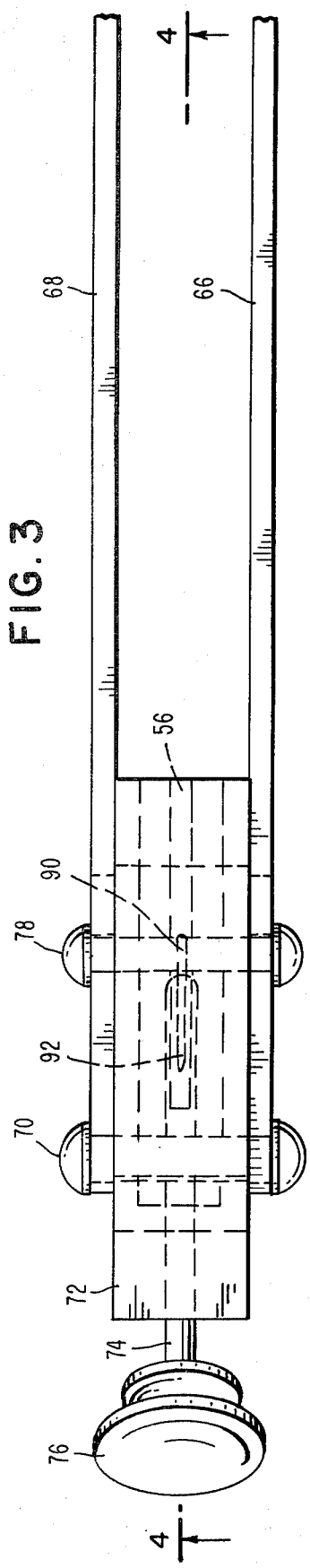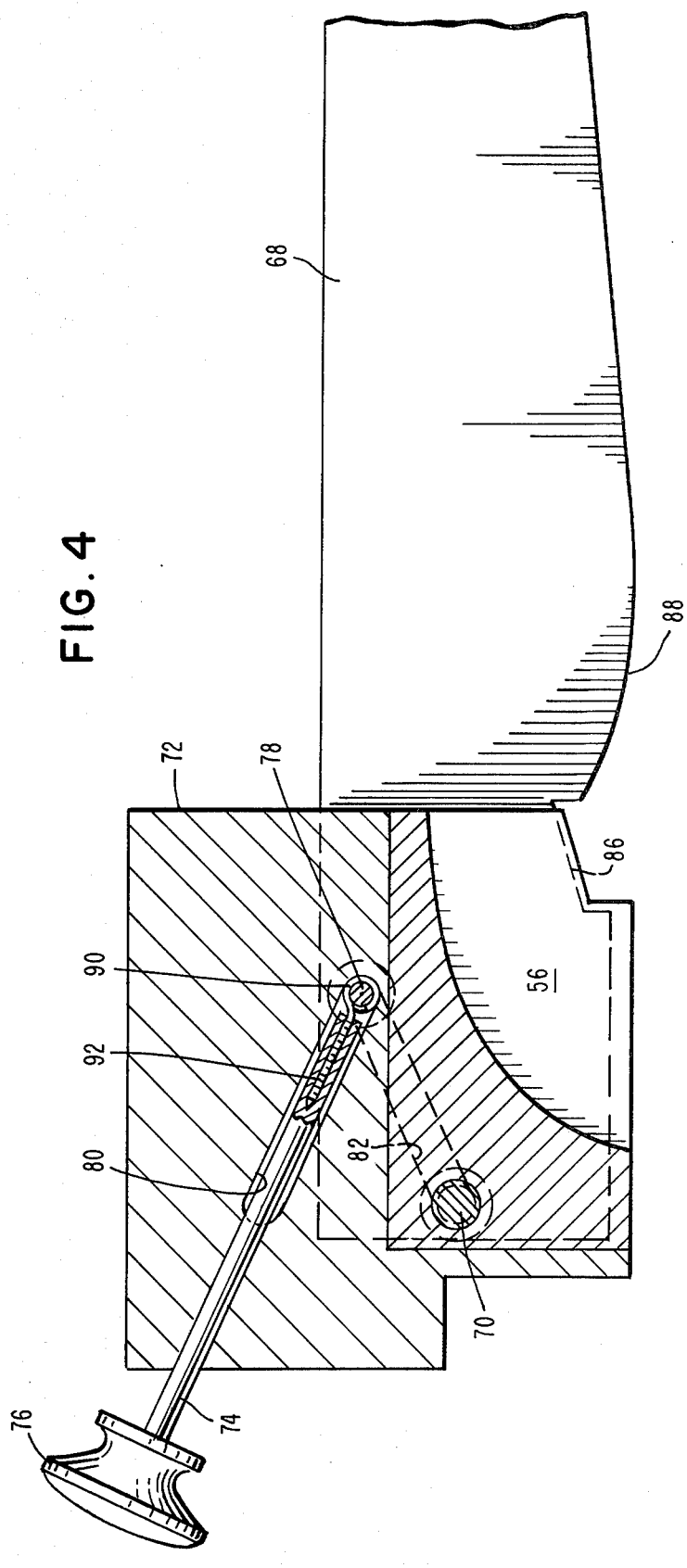

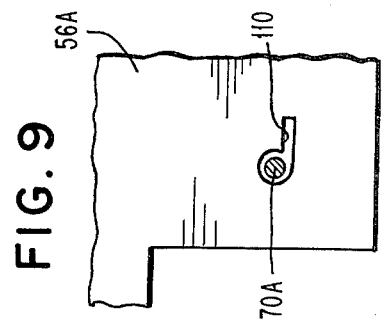
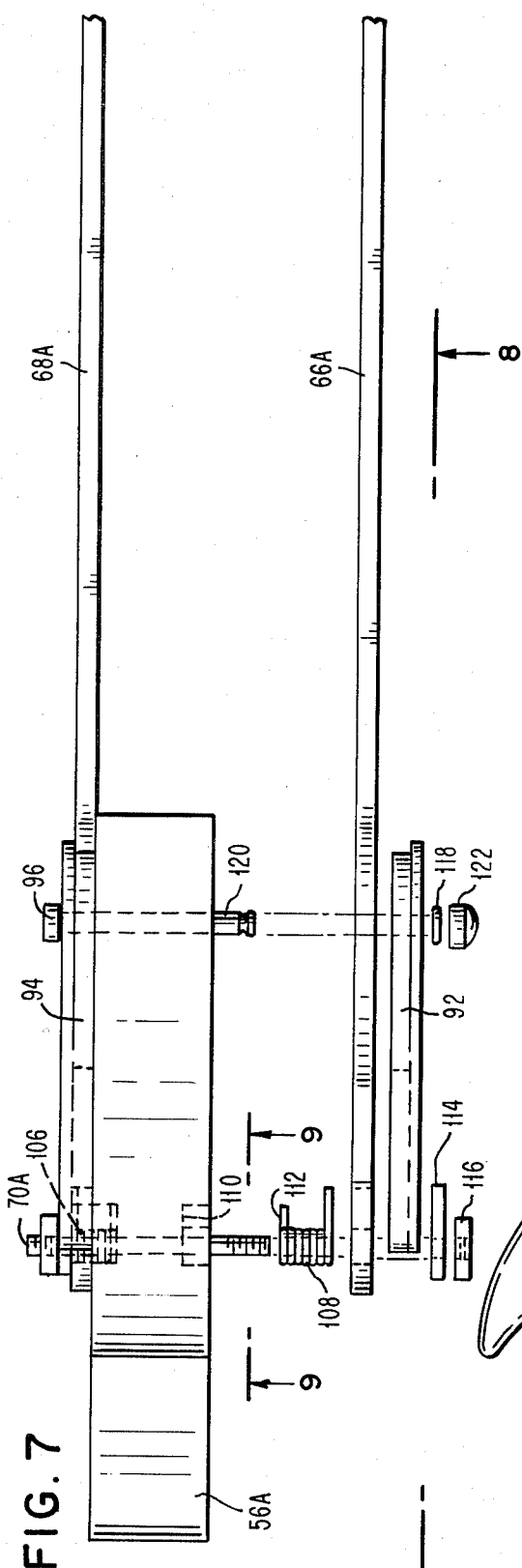
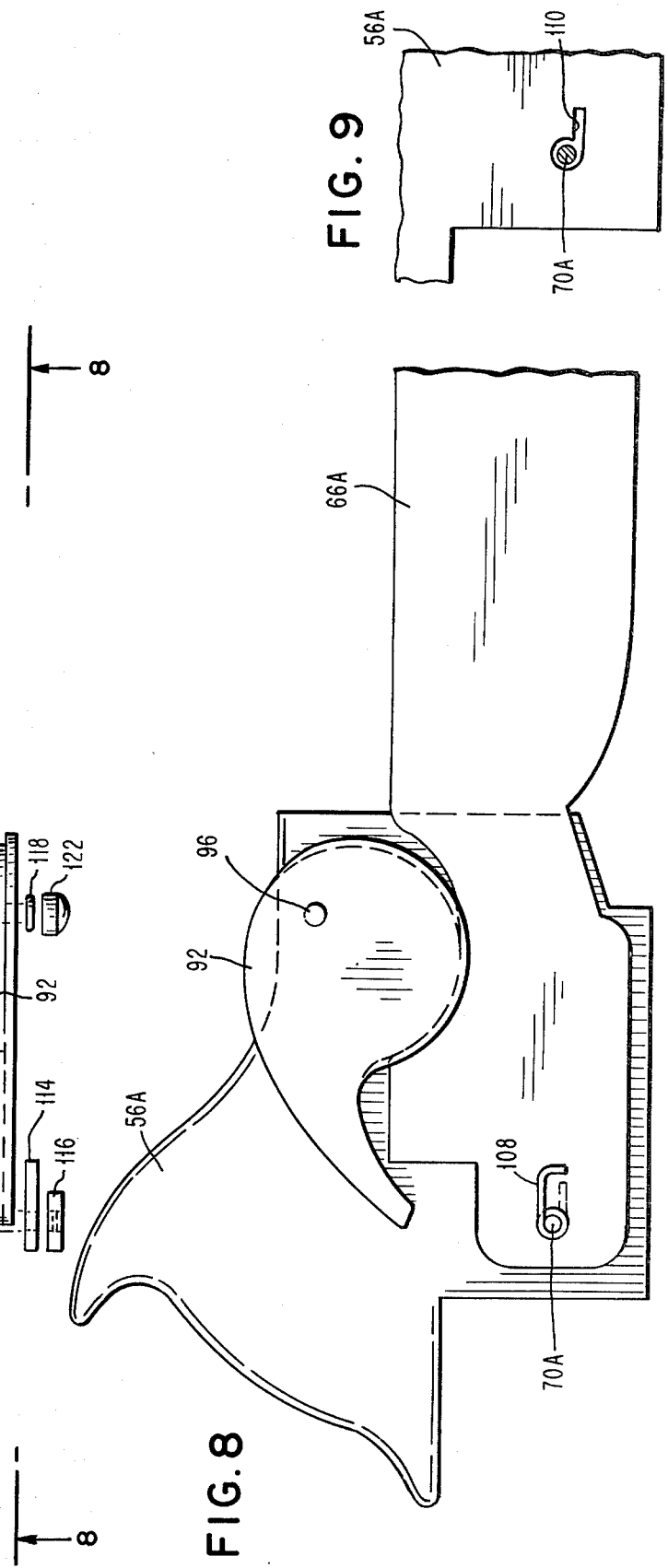

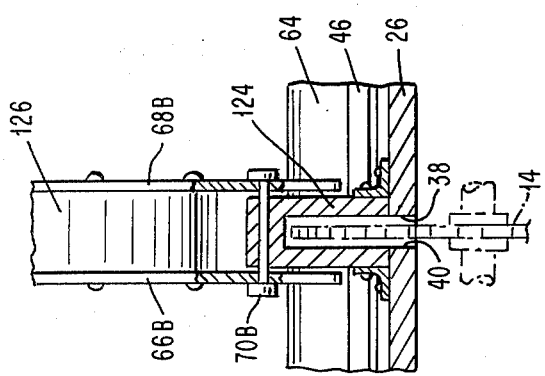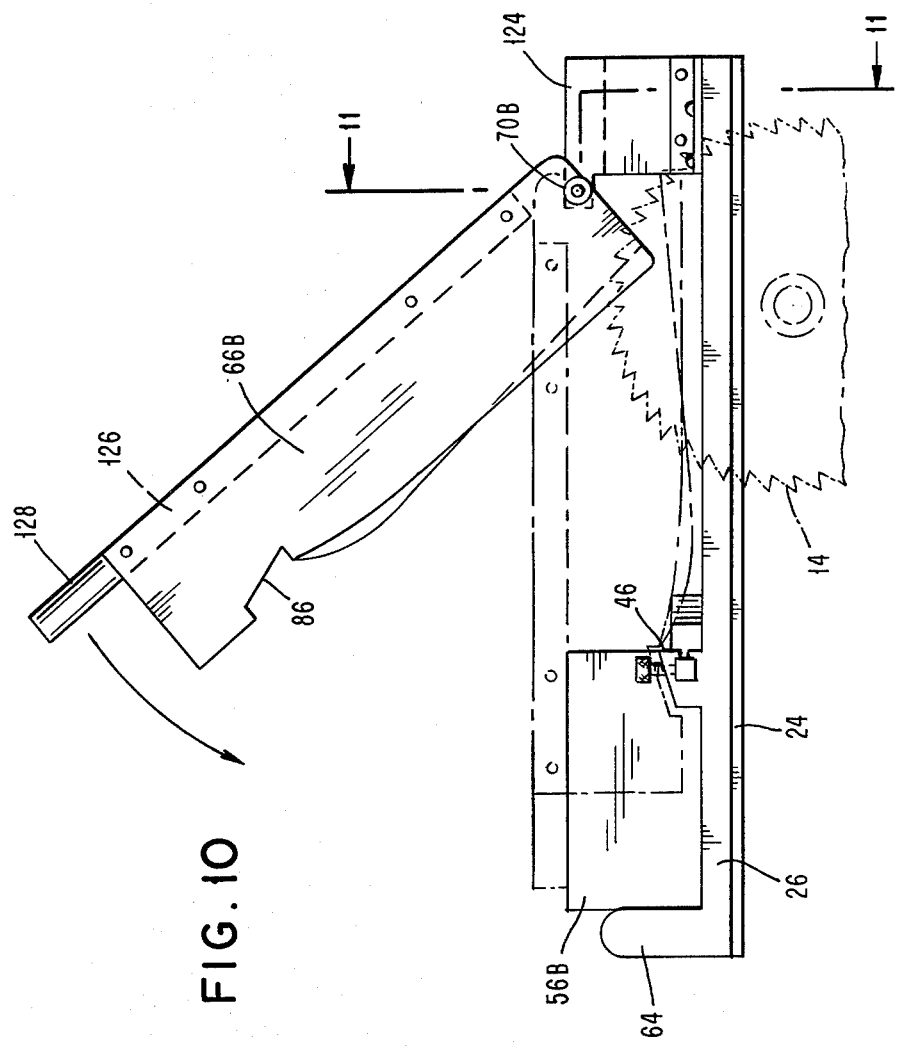

CUTTING TOOL JIG WITH CUTTER GUARD

CROSS REFERENCE TO RELATED CASES

This invention is an improvement of the invention disclosed and claimed in United States patent application Ser. No. 794,533 filed May 6, 1977 by Willis A. Smith for a UNIVERSAL JIG FOR TABLE ROTARY CUTTING TOOLS, now U.S. Pat. No. 4,111,409.

This invention relates to table rotary cutting tools, and particularly to an improvement in a jig for holding and feeding work to the rotary cutter of a table rotary cutting tool.

The work holding and feeding jig disclosed and claimed in the prior related patent application referred to above has been found to be extremely useful, and is especially valuable for increasing the safety of the user and in reducing the risk to the user of injury by operation of the table rotary cutting tool. However, even with the substantial increase in safety to the operator by the jig of the prior related invention, the rotary cutter of the rotary cutting tool still protrudes upwardly through the jig in such a manner that it is theoretically possible for the operator to injure himself by contact with the cutter. Also, with the jig of the prior invention, it is necessary for the operator to hold the work in place upon the jig with his hands as the work is advanced into the cutter.

Accordingly, it is one object of the present invention to promote the safety of the operator in a jig for feeding work into the rotary cutter of a table rotary cutting tool.

Another object of the invention is to promote the safety of the operator in a jig for feeding work into the rotary cutter of a table rotary cutting tool by providing a means for guarding the cutter to prevent the operator from moving his hands or fingers into contact with the cutter.

Another object of the invention is to promote the safety of the operator in a jig for feeding work into the rotary cutter of a table rotary cutting tool by providing an improved means for holding the work in place upon the jig so as to avoid the requirement that the operator hold the work in place upon the jig with his hands, to thus avoid exposure of the operator's hands to the cutter.

Still another object of the invention is to promote the safety of the operator in a jig for feeding work into the rotary cutter of a table rotary cutting tool by providing a combined work holding means and guard means for holding the work piece in place and for guarding the rotary cutter against contact by the hands of the operator.

Other objects and advantages of the invention will be apparent from the following description and the accompanying drawings.

In carrying out the invention, there is provided in combination in a jig for holding and feeding work to the rotary cutter of a table rotary cutting tool having a base plate slidably positionable upon the tool table and an upper flat surface for supporting a work piece which is to be cut and a substantially vertical work advancing abutment extending upwardly from said work supporting surface with a through-slot extending into the base plate from the edge thereof opposite to said work advancing abutment, a combination guard and work clamping means comprising two parallel plates pivotally attached to said jig and operable to be swung downwardly on opposite sides of said through-slot so that said two plates straddle said through-slot to clamp a work piece which is to be cut under the bottom edge of at least one of said two plates to thereby hold the work piece securely against said base plate and to substantially enclose the rotary cutter as the work is advanced into the cutter by forward movement of said jig.

In the accompanying drawings:

FIG. 1 is a perspective view illustrating a preferred embodiment of the invention.

FIG. 3 is a top detail view of a part of the embodiment of FIG. 1.

FIG. 4 is a side sectional view taken at section 4—4 in FIG. 3.

Figure 5:
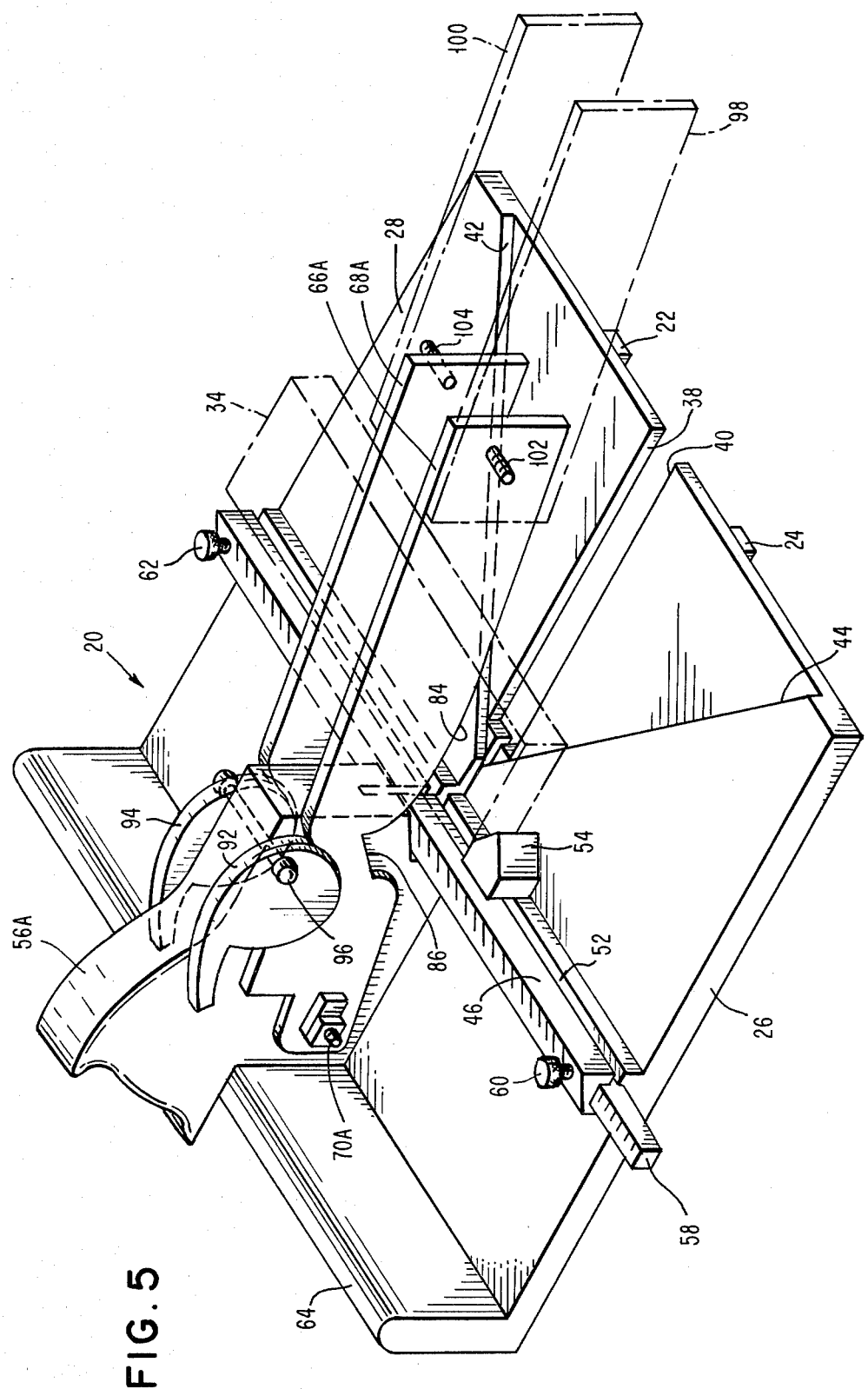
FIG. 5 is a perspective view illustrating an alternative embodiment of the invention.
Figure 6A:
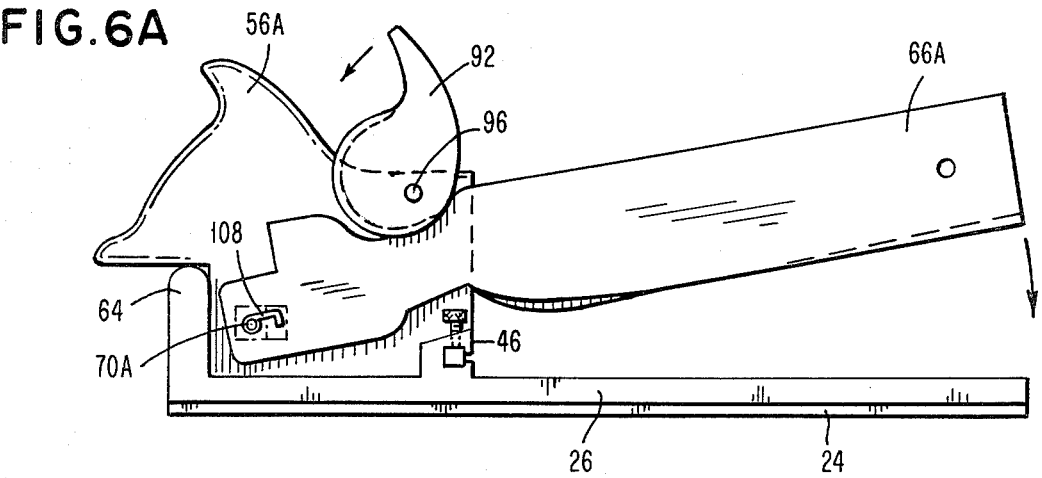
Figure 6B:
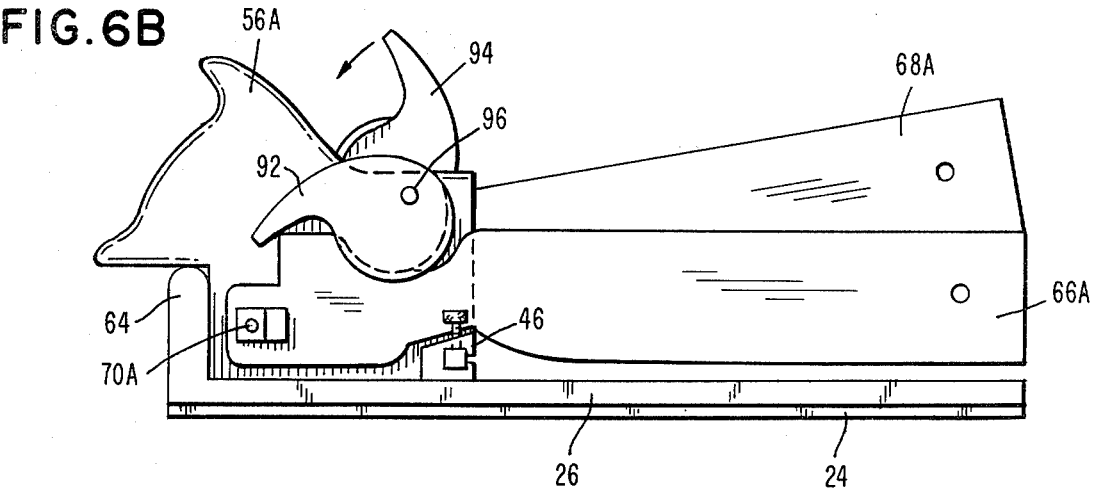
Figure 6C:
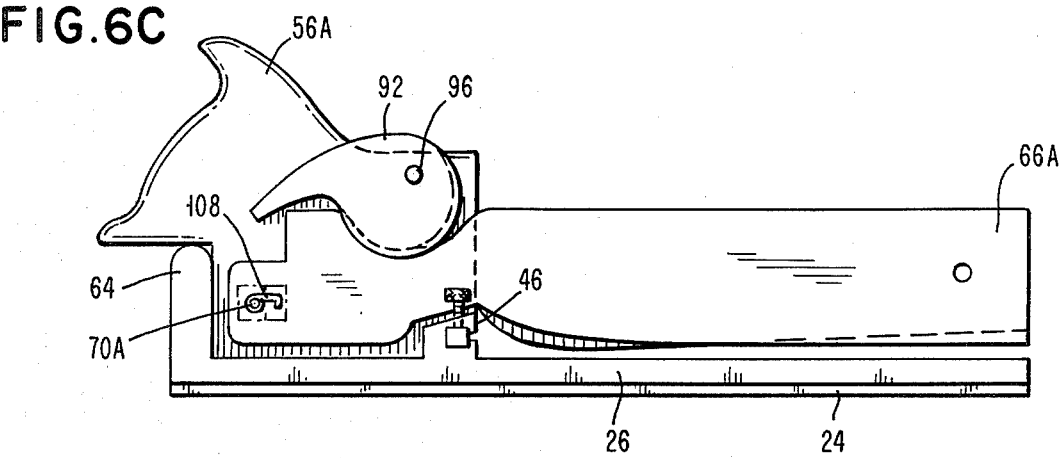

FIGS. 6A, 6B, and 6C are side views of the embodiment of FIG. 5 illustrating the parts in different positions.

FIG. 7 is a top view illustrating details of portions of the embodiment of FIG. 5.

FIG. 8 is a side detail view of the portions of the embodiment of FIG. 5 illustrated in FIG. 7, and taken at section 8—8.

FIG. 9 is a detail taken at section 9—9 of FIG. 7.

FIG. 10 is a side view of another alternative embodiment of the invention.

FIG. 11 is a sectional detail view taken at section 11—11 of FIG. 10.

Referring in more detail to FIG. 1 of the drawings, there is shown at 10 a table rotary cutting tool, such as a table saw, of the type with which the invention is intended to be used. The table rotary cutting tool, such as a saw 14, protrudes through the table top. On each side of the cutting tool 14 there is provided a substantially rectangular cross-section guide groove, as indicated at 16 and 18. The guide grooves are mutually parallel, and parallel to the cutting tool 14. The guide grooves are generally provided for the purpose of guiding work pieces into the cutting tool 14 for cutting by that tool, generally by means of a T-shaped guiding device having a guide rail which fits into only one of the guide grooves 16 or 18.

A preferred embodiment of the jig in accordance with the present invention, and as illustrated in FIG. 1, is indicated generally at 20, and includes guide strips 22 and 24 affixed at the bottom of the jig and arranged to slide within, and cooperate with, both of the guide grooves 16 and 18 respectively. The jig includes a base plate 26 which is slidably positionable upon the tool table surface 12 and which preferably has as many as two flat upper surfaces indicated at 28 and 30 for supporting a work piece which is to be cut. When a work piece is to be cut with a 45 degree cut, it may be positioned upon the work piece supporting surface 30. When a work piece is to be cut with a 90 degree cut, it may be supported upon the work supporting surface 28, as indicated in phantom at 34.

From the front edge 36 of the base plate there is a through-slot, the sides of which are indicated at 38 and 40, for providing clearance for the cutting tool 14 as work is advanced into the cutting tool by sliding movement of the jig 20.

With respect to the work piece supporting surface 30, there is provided a substantially vertical work advancing abutment 42 extending upwardly from the work supporting surface 30. The abutment extends outwardly from the through-slot 38–40 at a 45-degree angle. A corresponding abutment 44 is provided on the other side of the through-slot, and also extending at a 45-degree angle to the through-slot, so that the two vertical abutments 42 and 44 form a 90-degree angle with respect to one another. This provides a convenient means for supporting a work piece which is to be cut at a 45-degree angle. Such cuts are particularly useful for picture frames, trim around doorways, and many other similar purposes. Although separated by the through-slot 38–40, and although arranged at a 90-degree angle with respect to one another, the two abutments 42 and 44 may be regarded as comprising a single vertical abutment since they both serve the work supporting surface 30 of the jig.

The work supporting surface 28 extends back, parallel to the work supporting surface 30, from the upper edges of the vertical abutments 42 and 44 to a vertical abutment generally indicated at 46. Abutment 46 is arranged perpendicular to the through-slot 38–40, and serves to advance the work, such as work piece 34, into the cutter 14 when a 90-degree cut is required. Within the abutment 46 there is preferably provided a T cross-section slot 52 which extends substantially through the entire width of the abutment, and which is adapted to accommodate various attachments, especially including the shaft 58 of an adjustable stop member 54.

The through-slot 38–40 preferably extends through the center of the abutment 46 so as to provide for a complete cut-off of the work piece 34 by the tool 14, if desired. The jig includes a main guard member 56 which includes an extension of the through-slot 38–40 for accommodating the cutter 14. The guard member 56 completely covers the cutter 14 in the most advanced position of the jig in order to protect the operator from injury by the cutter 14. The stop member 54 is carried by a shaft 58 which snugly fits into the bottom (crossbar) portion of the T-slot 52, and which may be locked in position by means of a thumb screw 60. A corresponding thumb screw is provided on the other side of the jig at 62 for locking the stop member 54 when the stop member is assembled on that side of the jig. At the upper edge of the abutment 46, there is preferably included an integrally formed dimensional scale for convenience in positioning the stop member 54 in order to determine the dimension of the cut for the work piece 34. This is indicated in the drawing. As shown in the drawing, the upper surface containing the scale is preferably slanted back (to the left in the drawing) for ease in reading the scale. Additionally, if desired, a scale may be provided on the upper edge of the carrier rod 58 for the stop 54 as also illustrated in the drawing. The amount of rod 58 protruding from slot 52 is a function of the position of stop 54.

The jig also preferably includes a handle portion 64 extending vertically upward at the rear edge thereof for the convenience of the operator in advancing the jig during operation thereof.

While not shown in the drawing, in accordance with the teachings of the above-identified related patent application Ser. No. 794,533, the guide strips 22 and 24 are preferably adjustable in spacing with respect to the center slot 38–40 to accommodate to different table rotary cutting tools as described moe fully in the related application 794,533.

In accordance with the present improvement, a combination guard and work clamping means is provided which comprises two parallel plates 66 and 68 pivotally attached to the jig by means of a pivot pin indicated at 70, and operable to be swung downwardly on opposite sides of the through-slot 38–40 so that the two plates straddle the through-slot to clamp the work piece 34 which is to be cut under the bottom edge of at least one of the plates 66–68 to thereby hold the work piece 34 securely against the surface 28 of the base plate 26 and to substantially enclose the rotary cutter 14 as the work is advanced into the cutter by the forward movement of the jig. The plates 66 and 68 are illustrated in the partially lowered position in order to avoid obscuring the details of the rest of the structure.

In the embodiment of FIG. 1, the pivotal attachment of the plates 66 and 68 to the jig by means of pin 70 accomplished in part by means of a guard plate holder 72 which substantially surrounds and is mounted upon the main guard member 56. As disclosed more fully below, the pivot pin 70 preferably extends through a rear upper corner of the main guard member 56, and thus serves to attach the plates 66 and 68, and the guard plate holder 72 to the main guard member 56. The interior contours of the guard plate holder 72 are closely fitted to the exterior contours of the main guard member 56 to maintain a tight assembled relationship based upon a fastening solely by the pivot pin 70.

A further feature of the embodiment of FIG. 1 includes a push rod 74 having a handle 76 reciprocably movable within the guard plate holder 72. The push rod engages with a cross pin 78. The cross pin 78 is guided in a guide slot 80 and extends through actuating slots 82 in each of the plates 66 and 68. The shaft of the cross pin 78 is slightly smaller than the width of the actuating slot 82 so that the cross pin shaft may slide in the slot 82. The shaft of the pivot pin 70 is slightly larger than the width of the slot 82, and the end of the slot 82 is enlarged to accommodate the shaft of the pivot pin so that the plate 66 is not free to slide over the pivot pin 70 at the slot 82.

Since the cross pin 78 and the pivot pin 70 are never closer to one another than the minimum distance between the cross pin guide slot 80 and the position of the pivot pin 70 illustrated in the drawing, it is not absolutely necessary that the slot 82 extend all the way to the pivot pin 70. Thus, a separate opening can be provided for pivot pin 70, and slot 82 can be shortened, if desired. The guide slot 80 for the cross pin 78, and the attaching slot 82 in the plates 66–68, form an acute angle when the plates 66–68 are in the lowered position. This acute angle provides for a camming action by the cross pin with respect to the plate slots 82 to provide a substantial mechanical advantage in clamping the work piece 34 beneath the lower edge of the plates.

The bottom edge of each of the plates 66–68 preferably has a convex contour, as indicated at 84, to more effectively clamp the work piece 34. Each of the plates 66 and 68 also includes a cut out portion, as indicated at 86, to fit around the abutment 46.

Figure 2A:
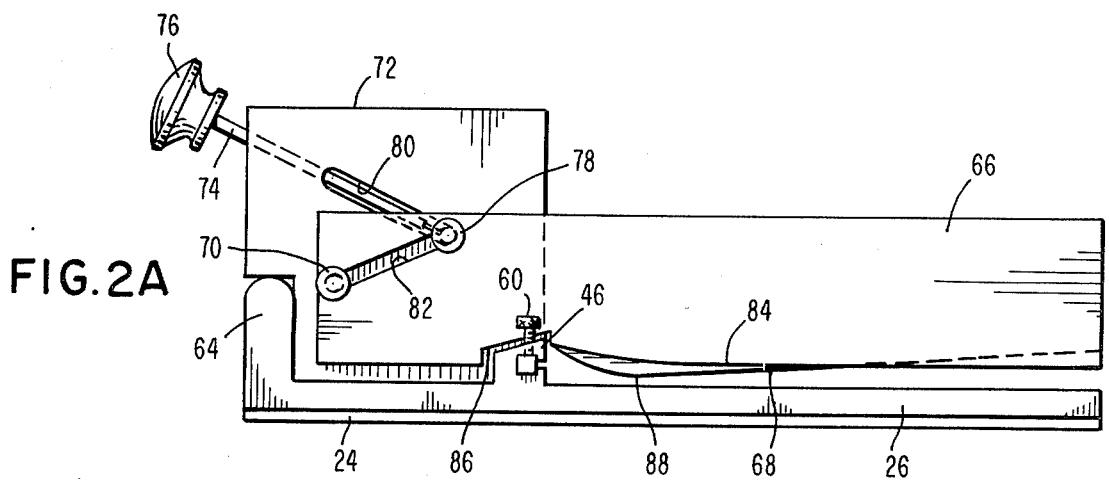
FIG. 2A is a side profile view of the embodiment of FIG. 1 illustrating the guard plates in the lowered position.
Figure 2B:
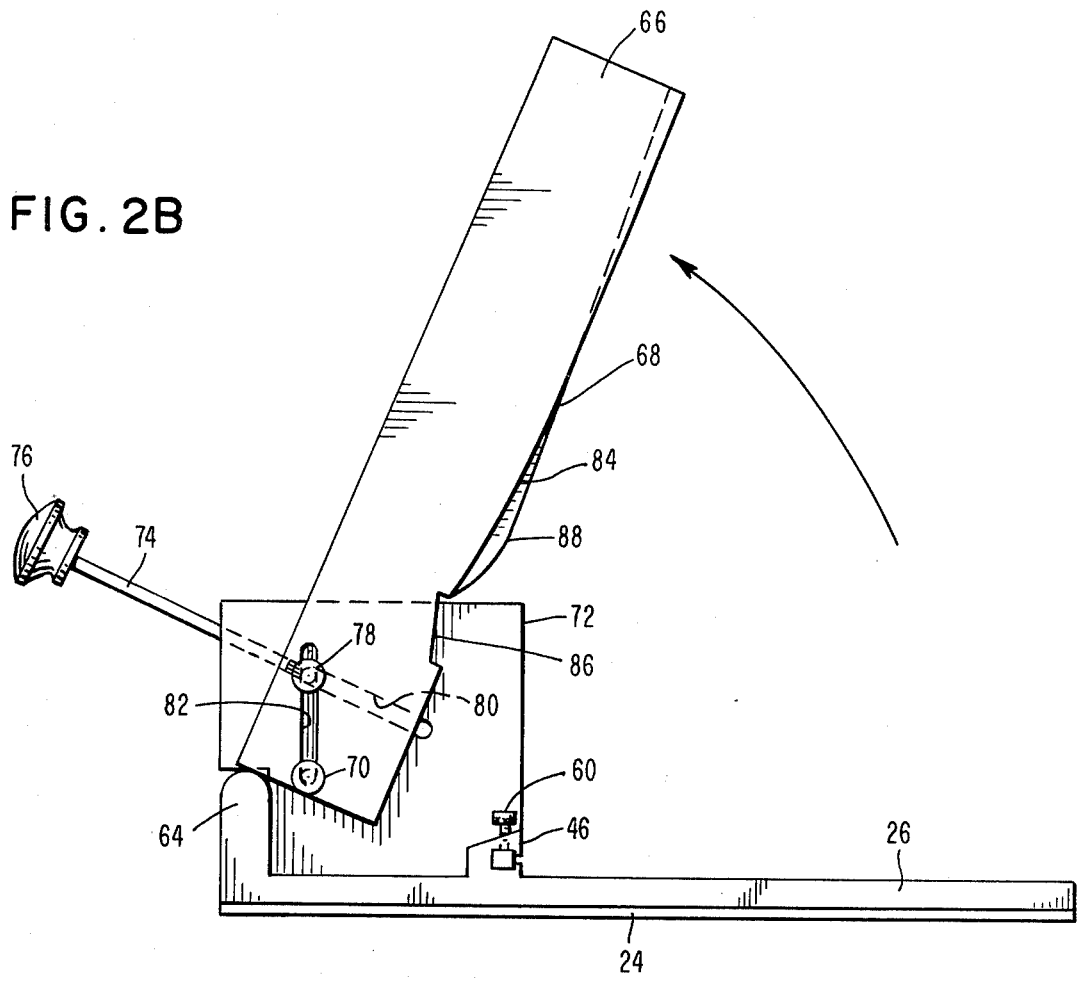
FIG. 2B is a profile view of the embodiment of FIG. 1 showing the guard plates in the raised position.

FIGS. 2A and 2B illustrate side profile views of the embodiment of FIG. 1 showing the plates 66 and 68 in the lowered and raised positions respectively. Accordingly, these views further illustrate the configuration and operation of the invention. For clarity, the stop member 54 has been omitted from FIGS. 2A and 2B.

In FIGS. 2A and 2B, the bottom edge of the plate 68 on the far side is clarity visible extending below the bottom edge of the near plate 66. This illustrates the principle that there is preferably a slight "play" in the horizontal guidance of the pin 78 so that the plates 66 and 68 may assume slightly different vertical positions to accommodate for irregularities in the piece 34 which is to be cut. Also, as illustrated in FIGS. 2A and 2B, the convex contour of the bottom edge of the two plates is preferably different, providing a maximum downward extension for the two plates at different spacings out in front of the abutment 46. Thus, the point of maximum downward extension, and also the point of maximum convex curvature of the plate 68 occurs as indicated at 88, whereas the corresponding point on plate 66 is at 84. Thus, the convex bottom contours of the plates provide for maximum lower extensions at different spacings in front of the work advancing abutment 46 to engage a work piece at different positions spaced in front of the work advancing abutment 46 in order to more effectively secure the work piece 34.

It is possible, of course, that if a very narrow cut is to be taken at the end of the work piece, only one of the plates may engage the work piece.

FIG. 2B shows how the retraction of the push knob 76 and the push rod 74 causes the retraction of the cross pin 78 in the guide slot 80, and thus causes the raising of the plates 66 and 68. This provides a substantial opening for the removal of the work piece and for the insertion of a new work piece.

FIG. 3 is an enlarged top detail view of the guard plate holder 72 and showing the attachment of the guard plates 66 and 68 thereto, and also showing the relationship of the guard holder 72 to the main guard member 56. From this drawing, it is to be seen that the guard plate holder 72 surrounds the main guard member 56 on three sides, leaving the front edge only open. FIG. 3 also illustrates the preferred connection means for connecting the push rod 74 to the cross pin 78 by means of a screw eye 90 which girdles the cross pin 78 and has a shaft 92 attached to the end of the push rod 74. This feature is shown even more clearly in FIG. 4.

FIG. 4 is a sectional view taken at section 4—4 in FIG. 3. FIG. 4 is especially effective in illustrating how the guard plate holder 72 surrounds the top and rear end of the main guard member 56. FIG. 4 also illustrates clearly how the pin 70 extends through the upper rear corner of the main guard member 56 to attach the guard plates 66-68 and the guard plate holder 72.

It will be appreciated from the above description that a downward and forward movement of the push rod 74 by means of the handle 76 by the operator causes the plates 66 and 68 to swing downwardly into the work piece clamping position. Thus, forward force on the push rod handle 76 may combine the operations of clamping the work piece, guarding the cutter, and advancing the entire jig upon the tool table to accomplish the cut.

If the cutting tool jig must be used without the cutter guard, such as when producing a bevel cut, or for cutting a mortise and tenon, it is a very convenient feature of this embodiment that the guard plate holder 72, with the guard plates, and the entire associated assembly can be quickly removed from the cutting tool jig simply by removing the pin 70 and lifting the assembly off of the jig.

FIG. 5 is a perspective view corresponding to FIG. 1, but showing a modification of the invention in which the modified guard plates 66A and 68A are pivotally mounted about a pivot 70A and are individually operable by means of cam levers 92 and 94 to be lowered into the work holding and cutter guarding position. In the embodiment of FIG. 5, the guard plate holder is combined with the main guard member in a single member 56A having a handle similar to a manual saw handle at the rear end thereof. The cams 92 and 94 are mounted on a common pivot pin 96 which extends through each cam and through the modified main guard member 56A.

Each of the guard plates is preferably provided with a return spring which is arranged around the pivot pins 70A for causing each guard member to rise as it is released by its cam 92-94. The structure of this return spring is described more fully below in connection with other views.

Guard plates 66A and 68A may be provided with articulated extension plates indicated in phantom at 98 and 100. The connections of the plates 98 and 100 to the guard plates 66A and 68A may be accomplished by means of pins 102 and 104. The extension plates serve to extend the cutter guard function for an additional dimension.

Generally speaking, all of the details of the embodiment of FIG. 5, other than those specifically pointed out in the immediately preceding description correspond precisely with the details of the embodiment of FIG. 1.

FIGS. 6A, 6B, and 6C are side profile views of the embodiment of FIG. 5 with the stop member 54 removed, and illustrating the operation of the lowering of the guard plates 66A and 68A individually by means of the cam devices 92 and 94. In FIG. 6A, both guard plates are raised. In FIG. 6B, guard plate 66A has been independently lowered by means of the cam actuator 92. In FIG. 6C, both guard plates have been lowered by the cam devices 92 and 94. Again, as in the first embodiment, the plates 66A and 68A preferably have points of maximum convex curvature and maximum lower extensions at different spacings in front of the work advancing abutment 46 to more effectively secure the work piece.

In each of FIGS. 6A and 6C, an end cover has been removed at the pivot pin 70A to reveal the presence of a return spring 108.

FIG. 7 is an enlarged top detail view of the guard member 56A and the guard plates 66A and 68A, with guard plate 66A and associated parts shown in an "exploded" relationship. In particular, the return spring 108 is shown in a position disassembled from the pivot pin 70A and removed from a cavity 110 in the guard member 56A where one end of the return spring 108 fits snugly.

FIG. 9 is a section view taken at section 9—9 in FIG. 7, and precisely shows the shape of the cavity 110. Referring again to FIG. 7, the return spring 108 includes a main body portion which is a spiral loosely embracing the shaft of pin 70A ending with a straight leg portion 112 which fits into the elongated portion of the cavity 110 in the guard member 56A to provide the means for exerting a torque upon the guard plate 66A. The other end of spring 108 extends into a similar slot in the plate 66A. This is shown in FIG. 8.

FIG. 8 is a side sectional view taken at section 8—8 in FIG. 7 with a cover plate 114 removed from the end of the pin 70A. Thus, the spring 108, with one leg anchored in the guard member 56A, and one leg anchored into the guard plate 66A, is capable of providing a torque between these two parts to automatically raise the guard plate 66A as the lever of the cam 92 is raised. The cover plate 114, and the plate 66A, may be maintained in an assembled position by means of a fastener 116, which may be in the form of a threaded nut which engages threads on the end of pin 70A. Similarly, the assembled relationship of the cam 92 upon the common cam pin 96 may be maintained by a snap ring 118 which engages a circumferential groove 120 in the end of pin 96. A decorative cover 122 may be snapped over the ring 118.

A spring 106 similar to the spring 108 is provided for the automatic raising of guard plate 68A. However, spring 106 is wound in a direction opposite from the spring 108 since the torque relationship for raising the guard plate 68A is opposite to that for plate 66A.

Cam pin 96 may preferably be made so as to be easily and quickly removable from the apparatus so as to permit removal of the associated cams 92 in case the guard plates 66A and 68A are not required. Upon removal of the cams 92, the guard plates are rotated to a straight up position by the springs 106 and 108, so that they are out of the way. The plates 66A and 68A may be made shorter than shown in the drawing, so that when they are in the raised position, they are not in the way.

FIGS. 10 and 11 illustrate still another modification of the invention in which the pivotal attachment of the parallel guard plates is at the front of the jig at 70B, instead of at the rear of the jig at the main guard member. In this embodiment, the pivotal support at pivot pin 70B is carried out by a separate U-shaped bracket 124, the structure of which is best illustrated in the sectional view of FIG. 11.

FIG. 11 is a sectional detail taken at 11—11 in FIG. 10. It is seen that the bracket 124 bridges across the slot 38-40 for the cutter 14. In this embodiment, the two guard plates 66B and 68B are preferably rigidly connected together, and are themselves bridged across at the top edges. Preferably the upper edges are completely closed by the bridging member 126, which may include a rear extension handle 128, by means of which the guard plates may be conveniently lowered. If desired, the bridging member and the two guard plates 66B and 68B may be formed as an integrated one-piece structure.

In FIG. 10, the entire guard plate assembly is shown in phantom in the lowered position. In that position, the two plates straddle the two sides of the main guard member 56B, and the handle 128 and the bridging connection member 126 are seated upon the top of the main guard member 56B, unless the bottom edges of the guard plates first engage a work piece to hold that work piece in position. Again, the bottom edges of the guard members 66B and 68B are preferably contoured as previously described in connection with FIGS. 2A and 2B to efficiently hold the work piece in position.

The embodiment of FIGS. 10 and 11 has the major virtue that it is very simple in construction and very easy to use and positive in operation.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

I claim:

1. In combination in a jig for holding and feeding work to the rotary cutter of a table rotary cutting tool having a base plate slidably positionable upon the tool table and an upper flat surface for supporting a work piece which is to be cut and a substantially vertical work advancing abutment extending upwardly from said work supporting surface with a through-slot extending into the base plate from the edge thereof opposite to said work advancing abutment,
   a combination guard and work clamping means comprising
   two parallel plates pivotally attached to said jig and operable to be swung downwardly on opposite sides of said through-slot so that said two plates straddle said through-slot to clamp a work piece which is to be cut under the bottom edge of at least one of said two plates to thereby hold the work piece securely against said base plate and to substantially enclose the rotary cutter as the work is advanced into the cutter by forward movement of said jig.

2. A combination as claimed in claim 1 wherein
   a camming means is provided for biasing said combination guard and work clamping means downwardly.

3. The combination as claimed in claim 1 wherein
   said parallel plates are movable independently of one another so as to be movable downwardly to different vertical positions.

4. The combination as claimed in claim 3 wherein
   camming means is provided comprising an individual cam lever for biasing each of said plates downwardly and for locking said plates in the lowered position.

5. The combination as claimed in claim 1 wherein
   said jig includes a main guard member comprising a housing extending upwardly from the surface of said jig in the vicinity of said vertical work advancing abutment and having a slot therein for receiving the cutter and for guarding the top of the cutter as the work is advanced through the cutter,
   said plates being mounted to straddle said main guard member.

6. The combination as claimed in claim 5 wherein
   said plates are pivotally attached to said jig by pivotal attachment to said guard member.

7. The combination as claimed in claim 5 wherein
   a guard plate holder is provided which substantially surrounds and is mounted upon said main guard member,
   said plates being mounted and supported upon said main guard member by means of said guard plate holder.

8. The combination as claimed in claim 7 wherein
   said plates are pivotally attached to said guard plate holder and to said main guard member by means of a single pivot pin which extends through both of said plates and said guard plate holder and said main guard member,
   the interior contours of said guard plate holder being closely fitted to the exterior contours of said main guard member to maintain a tight assembled relationship based upon the fastening solely by said pivot pin.

9. The combination as claimed in claim 1 wherein said plates are interconnected and pivotally attached to said jig at a common pivot axis for concurrent movement.

10. The combination as claimed in claim 9 wherein said interconnection between said plates comprises a substantially full cover member connecting the upper edges of said plates and substantially enclosing the space between said plates at said upper edges.

11. The combination as claimed in claim 10 wherein an elevated pivotal support means is provided for pivotally attaching said plates to said jig, said pivotal support means being positioned in front of said work advancing abutment, and said connected plates being pivotally supported on said pivotal support means to be swung downwardly and rearwardly towards said work advancing abutment to clamp a work piece which is to be cut.

12. The combination as claimed in claim 11 wherein the pivotal attachment of said connected plates upon said pivotal support means is at a position spaced above the elevation of the maximum protrusion of the cutter through said through-slot.

13. A combination as claimed in claim 1 wherein the bottom edges of said plates are cut out to fit over said work advancing abutment.

14. The combination as claimed in claim 1 wherein said plates each have a convex bottom contour designed to engage a flat upper surface of a work piece at a position spaced in front of said work advancing abutment.

15. The combination as claimed in claim 14 wherein the convex bottom contours of said plates provide for maximum lower extensions at different spacings in front of said work advancing abutment to engage a work piece at different positions spaced in front of said work advancing abutment in order to more effectively secure the work piece.

16. The combination as claimed in claim 1 wherein said jig includes a push rod reciprocably movable in a direction corresponding to the movement of said jig when advancing work into said rotary cutter and means for guiding and supporting said push rod, a cross pin arranged horizontally and connected to the end of said push rod for movement thereby, said cross pin engaging both of said plates and being operable when actuated by said push rod to swing said plates downwardly.

17. The combination as claimed in claim 16 wherein said cross pin engages said plate by means of slots in said plate, and wherein said guide means for said push rod includes a slotted guide for said push rod and said cross pin, said slotted guide for said cross pin being arranged at a position offset from the pivotal attachments of said plates to said jig and at an angle to said slots in said plates engaged by said cross pin.

18. The combination as claimed in claim 17 wherein the angle between said slotted guide means for said cross pin and said slots in said plates is an acute angle when said plates are in the lowered position to provide a cam effect for maximum mechanical advantage for clamping the work piece which is to be cut.

19. The combination as claimed in claim 18 wherein said guide means for said push rod and said cross pin provides for a downward and forward movement of said push rod to swing said plates downwardly into the work piece clamping position so that forward force on said push rod may combine the operations of clamping the work piece and advancing said jig upon the tool table.

20. The combination as claimed in claim 8 wherein said plates and said guard plate holder are quickly removable from said main guard member by removal of said single pivot pin.

* * * * *

UNITED STATES PATENT AND TRADEMARK OFFICE
CERTIFICATE OF CORRECTION

PATENT NO. : 4,206,672
DATED : June 10, 1980
INVENTOR(S) : WILLIS A. SMITH

It is certified that error appears in the above—identified patent and that said Letters Patent are hereby corrected as shown below:

Column 4, line 21, --is-- should be inserted before "accomplished";

line 53, "attaching" should read --actuating--.

Column 5, line 4, "clarity" should read --clearly--.

Signed and Sealed this

Second Day of September 1980

[SEAL]

Attest:

SIDNEY A. DIAMOND

Attesting Officer  Commissioner of Patents and Trademarks